FIP8212    XR    4,005,443

United States Patent [19]
Albrecht

[11] 4,005,443
[45] Jan. 25, 1977

[54] SCANNING DEVICE AND METHOD FOR AUTOMATIC FOCUSING

[76] Inventor: Fritz Albrecht, Rte. 4, Box 240, Brevard, N.C. 28712

[22] Filed: Sept. 11, 1975

[21] Appl. No.: 612,295

[52] U.S. Cl. .................................. 354/25; 250/201; 250/209; 354/31
[51] Int. Cl.² ........................................... G03B 7/08
[58] Field of Search .............. 354/25, 31; 352/140; 250/578, 201, 209; 318/640; 178/7.1, DIG. 29

[56]              References Cited
           UNITED STATES PATENTS

| 3,896,304 | 7/1975 | Aoki et al. | 354/25 |
| 3,909,520 | 9/1975 | Mend et al. | 178/7.1 |

OTHER PUBLICATIONS

"The Automatic Focusing of Optical Systems" by Peter MacKeith, The British Journal of Photo., July 4, 1975.
"DEFT: Direct Electronic Fouvier Transforms of Optical Images" Kornreich et al., Proc. of the IEEE, Aug. 8, 1974, pp. 1072–1087.

Primary Examiner—Russell E. Adams, Jr.
Attorney, Agent, or Firm—J. Gibson Semmes

[57]              ABSTRACT

A device for automatically focusing an image in an optical system such as a camera wherein a photosensitive array having a plurality of discrete sites is positioned in the focal plane of the optical system to dissect the image into segments and determine the light intensity at each segment. Means are interposed in the focal plane to vary the focus of the image, the illumination of the photosensitive array being dependent on the degree of focus of the image. The discrete sites have a charge produced thereon depending on the degree of illumination. Address means scan the photosensitive array and read out the charges on the discrete sites to form a pulse train. Discrimination means are connected to the address means to determine when the frequency of the pulse train is maximized to indicate sharp focusing of the image, as the focus of the image is varied.

4 Claims, 2 Drawing Figures

SCANNING DEVICE AND METHOD FOR AUTOMATIC FOCUSING

BACKGROUND OF THE INVENTION

1. Field of the Invention

The invention relates to a solid state scanning device for automatic focusing and has particular utility in camera lens focusing. The invention is likewise closely related to my U.S. Pat. No. 3,918,071 entitled AUTOMATIC LENS FOCUSING METHOD AND APPARATUS, dated Nov. 4, 1975.

2. Description of the Prior Art

It is well known that images may be scanned by combinations of mechanical and optical apparatus of great complexity. When added to a 35 mm camera, for example, the bulk of a mechanical scanner and the required power supply represent a substantial part of the total. The investment in automatic focusing may well exceed that of the camera.

The moving parts of the scanner introduce vibrations, because a scanner rotates or pendulates at high speeds. These are principally a fundamental of high frequency and, experience teaches, many higher harmonics. Such vibrations will be translated into electrical noise equivalents by the scanner and will appear in the scanner output admixed to the image-derived frequencies. Thus, the output of the scanner becomes the sum of the image-derived frequencies, plus the vibration-induced frequencies. This composite is the input to the electronics which, by design, are particularly responsive to high frequencies. Thus the electronics will erroneously respond to the true input.

A further disadvantage of mechanical scanning devices derives from their scanning in circular patterns as shown in U.S. Pat. No. 3,776,639 of Stauffer. In most cases a rectangular format is changed. In the case of a 35 mm film frame, actually 24.5 × 36.3 mm., the circular scan may be made to inscribe itself in the rectangle so as to be tangent to two or three frame borders. Alternately it may be made to scan so that the scan circle circumscribes the format, with the corners of the frame located on the scan circle. In the first case only 53% of the image is scanned. In the alternate case, 100% of the image area plus 16% of an area external to the image are scanned. Assuming that during scanning of the format itself the unavoidable noise level results in a 100:1 signal to noise ratio, then the unwanted noise from the overscan will reduce the signal/noise ratio to 86:1 when integrated over both the image scan and overscan for a period of time. This represents a serious deterioration of the information.

One further deterioration of the signal will occur when abrupt changes arise as the scan becomes tangent to or traverses the image frame. This abrupt edge will induce high frequency transients of high value. Diffusion of the edges, reduction in scan diameter or other methods will reduce the scan area and thus decrease the information gained. Scanning into the frames will produce spurious high frequency response with the deleterious effects noted previously. As there is no present remedy, one of these conditions, as a minimum, must be tolerated in mechanical scanning.

Where scanning through a mask is employed, as in U.S. Pat. No. 3,776,639, about 50% of the information is lost as the scan sweeps across the opaque portions of the mask. U.S. Pat. No. 3,691,922 utilizes only a small amount of the energy from the image as does U.S. Pat. No. 3,532,045. The relatively low efficiency of partial scanning of the image will lead to poor performance in low light conditions specially.

SUMMARY OF THE INVENTION

It is the object of the present invention to provide scanning apparatus which has no moving parts and therefore is vibration-free and which scans 100%, practically, and no more of an image, or format to produce optimum utilization of the image energy with a maximum signal:noise ratio. Further, there is no sensing of image borders. Also, solid state parts with their proven superiority in the areas of cost, shock, wear, power economy, mass producibility and repairability are used.

To achieve scanning, i.e. to dissect an image into points and ascertain the light intensity at each point, photovoltaic or photoresistive materials are formed into minute devices, and a multiplicity of such photosensitive devices are disposed on a substrate in the focal plane of, say, a camera. They are fed by a common power bus to an input side and have individual output leads to connect each device to a gate on a charge-coupled array. The charge-coupled array is a device characterized by having located on an insulating substrate a multiplicity of elements, divided in rows with each row having an input and output common to all elements in a row, and, in addition, having individual leads to a gate, similar to field effect transistor, on each unit. Through these individual leads the elements accept charges and hold them for long periods of time, much longer than necessary for their present employment. The photosensitive devices may put charges or no charge on the individual gates in accordance with the illumination of the photocell. The lead common to a row of charge-coupled devices is used to move the charges along this lead to an output. A pulse injected into the common lead will cause a movement of the first charge in the path. Said charge will repel the charge on the adjacent side further on which in turn will repel the next charge, similar to a "domino effect". If a continuous stream of pulses are injected all charges are moved one position ahead for each pulse. Travel will be toward the output terminal. The output terminal will thus see a string of pulses of varying amplitude. If there be no charge on one or more gates of the charge-coupled array, the pulse train will have corresponding "zeroes", i.e. lack of pulses in the time-corresponding point of the pulse string.

Row-like arrangement of the photosensitive devices is not essential. For instance, a random arrangement may be resorted to to make non-random images, such as parallel lines in the image, effective. This parallel line image would, in the worst case, impose itself on the rows in a 1:1 relation with greatly diminished pulse output from each row or no pulse output. It is essential, however, that at least two sites are adjacent in one row. Each photoresistive site is connected by a conductor to gates in the charge-coupled array. In a practical application the photo-resistive sites may be on one side of a substrate and the charge-coupled array on the other, connection between the two made by plated-through holes, for instance.

The lens system of the invention is moved from long-range focus to short-range focus, thus varying the sharpness of an image projected on a substrate having a multiplicity of photosensitive sites in one embodiment or presenting, in a second embodiment, such surface that light quanta create, typically, hole-electron pairs. Each of the sites is electrically connected directly or through an amplification stage on the chip to one potential well of a charge coupled array in the first embodiment. In the second embodiment the point of light quanta impingement may be the potential well directly. Periodically, a group of photosensitive sites is disabled in the first embodiment, or the defining voltages about groups of potential wells are modified and the charge-coupled array gates are pulsed in a specific voltage pattern to achieve directionality so that the charges are moved off onto a bus. The charges thus appear as a train of discrete output pulses having amplitudes corresponding to the outputs of the respective photosensitive sites, one in embodiment I and the potential wells in the other embodiment, the sites or wells in turn having outputs corresponding to the light impinging upon them.

Charges may be moved off in either embodiment, as described, one line at a time. When the lines are parallel to each other and as a worst case, the image has its principal elements parallel to these lines, whose lines are either blanked out, or illuminated evenly along their lengths and not possessing light gradients. Thus, there is no in-line gradation and focusing is difficult as there is only a line-to-line gradation. This is the case in other devices which resort to arranging photosensitive sites in some pattern or other. This may be done in the present two embodiments also.

The second embodiment lends itself to an improvement on the above expedient of adopting a zig-zag pattern which would make the line manufacture more difficult than straight lines. When, say, the lines are running vertically and are addressed from the top so as to move the line contents to the bottom, we have the above case. Now, however, we add a second address means which moves lines, say, from left to right. Thus, on two sequential addressings we get all the lines of an image. This is possible with state-of-the-art devices, commonly called CCDs (Charge Coupled Devices). The option of addressing one line at a time or more than one in a frame, whether to dump the outputs into one collecting bus or more than one should be assumed to be stratagems routinely employed by those in the know.

Because a sharply focused image has relatively abrupt changes from light to dark, the pulse train for the charge-coupled array will consist of pulses of relatively short rise times, indicating that high frequency content is predominant. These pulses are fed to a frequency discriminating device for further processing to provide automatic lens focusing.

Where extremely high light intensities tend to saturate the illuminated areas and diminish the dropoff from saturation even in the areas of low illumination, the overall sensitivity of the CCD must be diminished by means of an automatic sensitivity control. One embodiment of such a control in an electronically operated camera wuld be to close down on the iris by the camera's exposure control system. In the reverse case of low illumination the reverse action would be employed. In any case, the integrated power of the input to the frequency discriminator, or, to use the more common term, the output level of the CCD will initiate modification of the sensitivity. A theoretical maximum output level would be equal to one half the voltage attained when the entire CCD is saturated. Necessary CCD saturation control and purge before operation is necessary to coordinate embodiment II of the present invention with a specific discriminator and camera control. This is brought out in the description of operation below.

Figure 1:
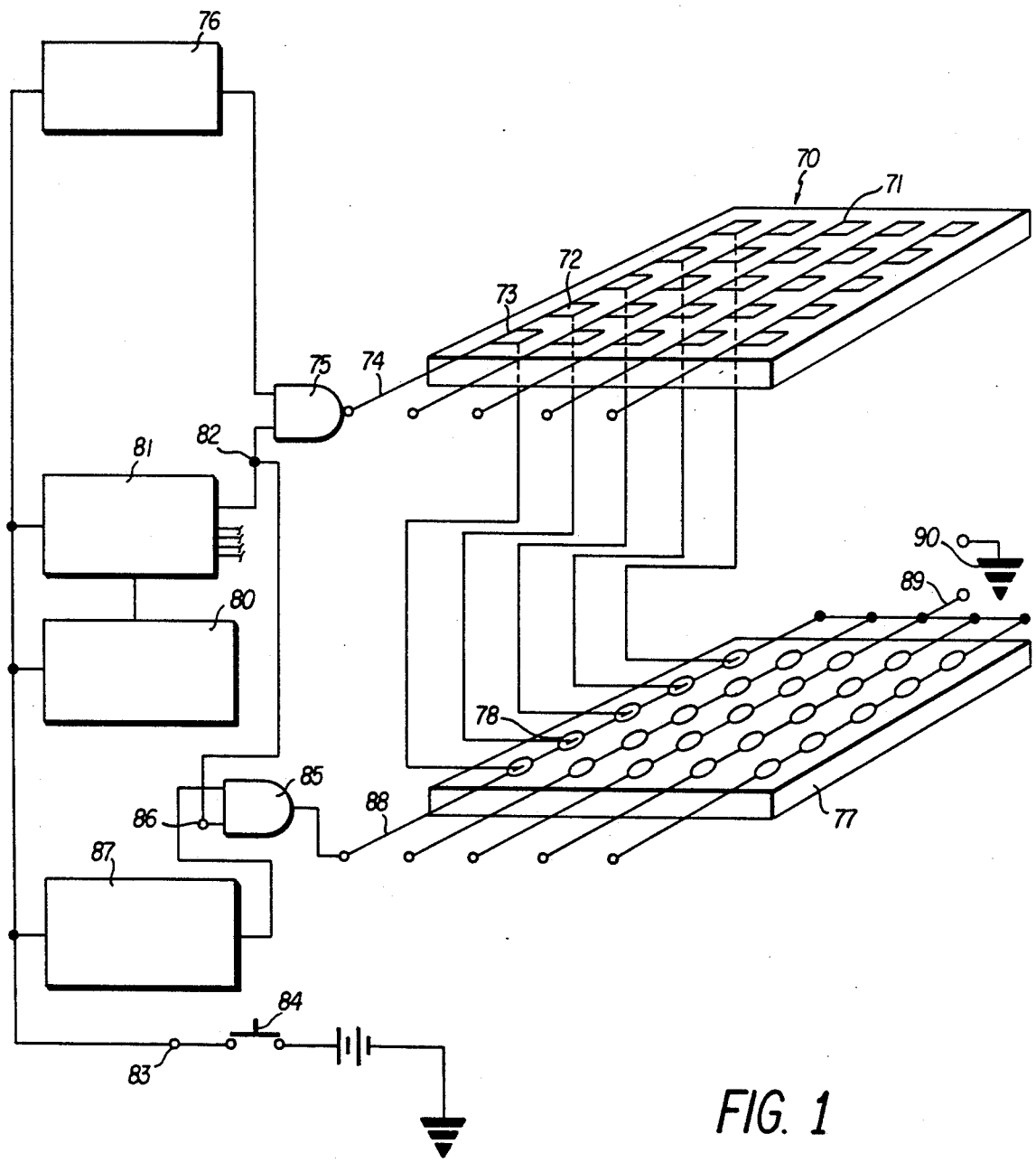
FIG. 1 shows a charge coupled array and manner of scanning same.

DETAILED DESCRIPTION OF THE DISCLOSURE:

FIG. 1 shows the general application of a charge coupled array to form and hold charge pockets produced in response to a distribution of light densities, and the manner in which these may be read or scanned. A photoresistive array 70 is mounted in the focal plane of a camera (not shown). The array 70 is composed in part of an insulating substrate 71 on which photoresistive sites are located of which 72 is representative. Each group of sites 72 is in rows 73 in this embodiment. The rows are fed by line 74 connected through gate 75 to power source 76, a regulated low voltage supply.

The relationship between the photoresistive array 70 and a charge coupled array 77, is shown in the figure with the representative units 72 for a photoresistive site and 78 for a charge coupled unit. There are as many charge coupled sites as there are photoresistive sites. Each photoresistive site is connected to one charge coupled site, as shown in the diagram for the first row.

Power to the electronic scanner is furnished by terminal 83 through push-button switch 84. A pulse generator 80 furnishes control of the operation of the electronic scanner through "clock" pulses and is connected to a ring counter 81 which has as many stages as there are rows 73 in the photoresistive array 70. Five outputs are shown in the figure, one connected to terminal 82. The four outputs which are not connected would lead to a terminal similar to 82, one for each row 73. For each row like 73 there is one gate. Its control input is from a terminal 82. The design is such that when a voltage appears at the gate input from 82, the gate does not conduct. In the present case, which is illustrative of five gates, the power feed from 76 to line 74 would be interrupted. From terminal 82 there is a connection to gate 85 via terminal 86. This gate functions so that when a voltage appears on its control line from 86 it conducts, connecting pulse generator 87 via gate 85 to line 88. This again is representative of five gates total like 75 and 85.

As an operator presses switch 84, power appears on terminal 83 and at the inputs to pulse generator 87, pulse generator 80, ring counter 81 and power supply 76. The ring counter may make any one stage conductive. Whichever stage starts the sequence does not matter. The conducting stage of ring counter 81 may, for illustration, be the one connected to terminal 82. This stage, by design, will put a voltage on terminals 82 and 86, which appears on the control terminals of gates 75 and 85. As gate 75 becomes non-conductive, power is shut off from row 73 to prevent the cells in that row from interfering with the action below. Simultaneous with the above, presence of control voltage at 86 makes gate 85 conductive to apply pulses on row fed from 88. This results in moving off the charges on this row of capacity-coupled devices serially onto line 89. The clock, pulse generator 80, pulses at such frequency that the pulse generator 87 has time to move the charges off lines 88. When one set of charges is moved off, the clock will furnish another pulse to advance the counter by one stage. Voltage is now removed from control input to gate 75, causing reapplication of power from 76 to 73. Simultaneously gate 85 becomes nonconductive and pulse generator 87 ceases to pulse line 88. This makes the charge coupled devices in the row fed by 88 to resume charging. Further at this instant, one terminal on the ring counter goes high as a result of its associated stage becoming operative. This causes another gate like 85 to close and pulse the associated line, dumping its content onto the output line and to terminal 89. Simultaneously a gate like 75 interrupts power from 76 to a row like 73.

Thus, in this scanner all but one row of photoelectric devices scans. The row which does not scan is emptied of its charges. Thus, there appears a continuous flow of pulses at the output. The acquisition of energy from the image by the photoelectric cells may, in low light situations, be marginal. In such cases amplifiers can be interposed between sites 72 and charge controlled units like 78, which would be parts of the integrated circuit substrate.

Figure 2:
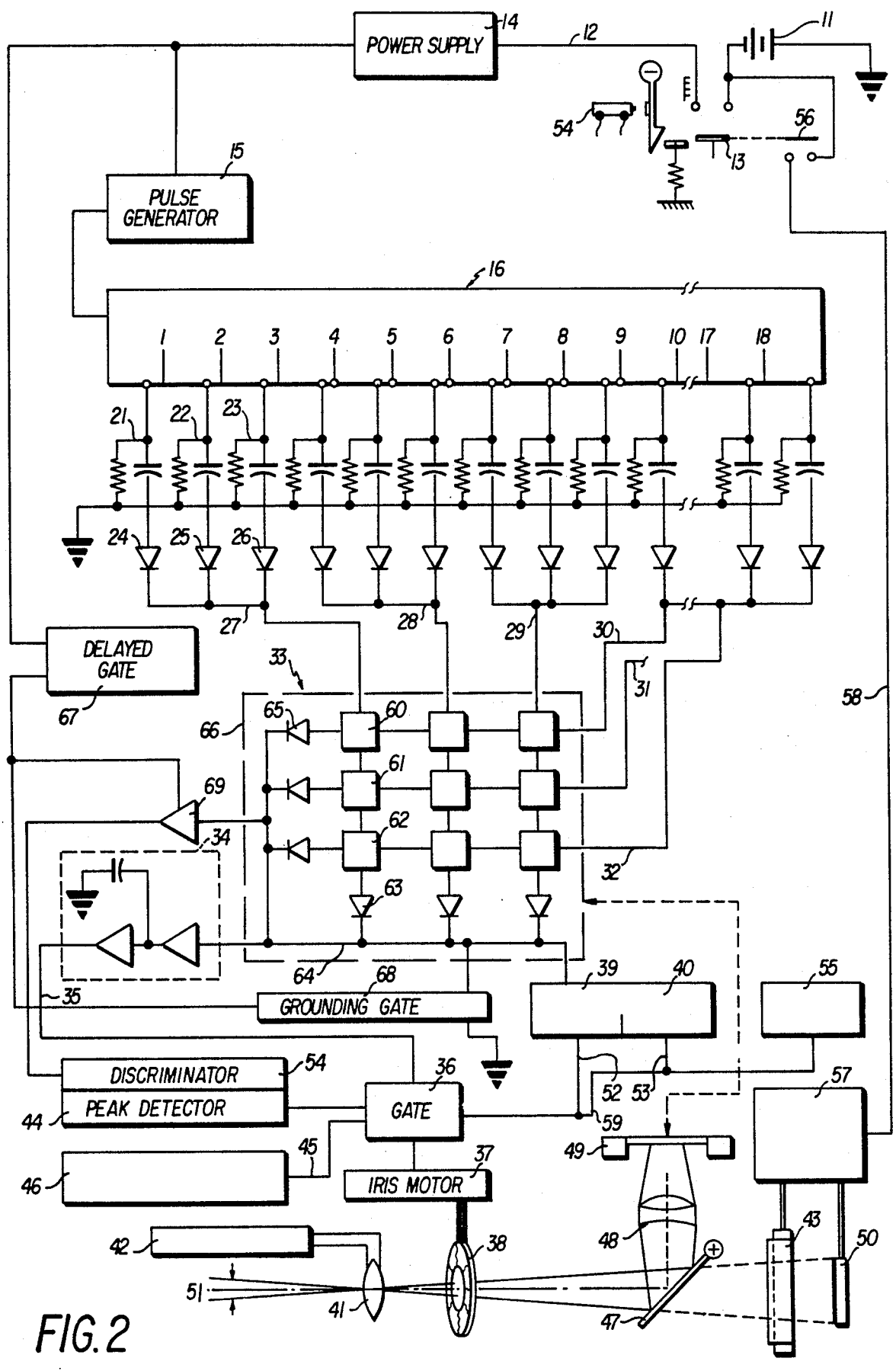
FIG. 2 is an electrical schematic diagram of the scanning system of the invention used to focus a camera.

FIG. 2 is an electrical schematic diagram of the solid state scanning system used in conjunction with an optical system for a camera according to the invention. The power supply for the system comprises battery 11, connected to line 12 through switch 13. The operator upon depressing switch 13 to the closed position energizes power supply 14 to power the system. Pulse generator 15 is connected to the output of power supply 14 and periodically pulses ring counter 16 in a manner well known in the art, and therefore not described in detail herein.

The ring counter 16 is shown as comprising eighteen stages, although the invention is not limited to this number of stages. Pulsing of ring counter 16 by pulse generator 15 activates successive stages of the ring counter to conduction in series fashion, with the final stage 18 pulsing the first stage to maintain the ring counter operative, through the shown feedback connection from stage 18 to stage 1. The outputs from ring counter stages 1 through 18 are connected in triad configuration. Thus ring counter stages 1, 2 and 3 are connected to differentiator circuits 21, 22 and 23 respectively and feed square waves thereto when pulsed to conduction. The outputs of differentiator circuits 21, 22 and 23 are connected to one end of isolation diode 24, 25 and 26, respectively, the other ends of said diodes being connected to common line 27. Ring counter stages 4, 5 and 6 are similarly connected to differentiator circuits and isolation diodes in triad configuration, the outputs from said diodes being connected to common line 28. Ring counter stages 7, 8 and 9 are similarly connected through to common line 29; ring counter stages 10, 11 and 12 to common line 30; ring counter stages 13, 14 and 15 to common line 31; and finally, ring counter stages 16, 17 and 18 to common line 32.

Charge coupled device 33 is physically located on its holder 66 in a manner such that it is coplanar with film 50 of a device to be focused, such as a camera. The sharpness of the image as a function of the position of optics 41 is identical on the charge coupled device photosensitive surface and the surface of film 50. If the charge coupled device 33 is different in size than film 50, optic device 48 may be employed to coordinate the two such that the format of the image on the charge coupled device photosensitive surface is identical to that on the surface of film 50.

For the purpose of explaining the invention, assume that object 51 is focused through optics 41, iris 38 and mirror 47 onto the photosensitive surface of charge coupled device 33, such that only a photosensitive potential well associated with site 60 is illuminated. Under such circumstances, a charge will develop in the potential well under site 60. Then, when a pulse is forwarded to line 27 from one of the ring counter stages 1, 2 or 3 connected thereto, for example, ring counter stage 1, the charge on site 60 will be moved to the next site on the y-axis, that is to site 61. The successive next two pulses applied to line 27 through ring counter stages 2 and 3 will move the charge from site 61 to site 62 and then to line 64 through isolation diode 63. Had there originally been charges on sites 61 and 62, because of illumination thereof, they also would have been moved ahead to line 64 as discrete charges.

Because the assymetry characteristic of the potential well configuration of the photosensitive sites provides for high directionality, a pulse applied to a y-axis line (lines 27, 28 and 29) will move charges forward in the y-direction. Thus, in the same manner as described above with respect to ring counter stages 1 through 3, the next three pulses successively presented at the outputs of ring counter stages 4, 5 and 6 will move charges on line 28, and pulses applied by ring counter stages 7, 8 and 9 will move charges on line 29. In an identical manner, the x-axis common lines 30, 31 and 32 will be addressed by their associated triad stages and pulses applied thereto will move charges on the photosensitive sites through isolation diodes like 65 to common line 64 row by row.

At the initiation of operation of the system, it is necessary to clear charge coupled device 33 of any and all charges that may have collected thereon spuriously during the preceding off period. These charges, not being indicative of focus conditions, do not affect the focusing operation by getting delayed gate 67 to apply an enabling signal to activate the successive circuitry only after a predetermined time has elapsed permitting clearing out of spurious signals from charge coupled device 33.

This function of delayed gate 67 prevents enabling of grounding gate 68 and isolation amplifier 69 until said predetermined time has elapsed and the charge coupled device 33 has been cleared of spurious charges that may have developed thereon during the immediately preceding off period. The predetermined time normally comprises, for example, a few milliseconds; thereafter delayed gate 67 is operative to enable grounding gate 68 and isolation amplifier 69. Coincident with the predetermined time during which an enabling voltage is not present at the output of delayed gate 67, normally closed grounding gate 68 clamps line 64 to ground. When the predetermined time elapses and delayed gate presents an enabling voltage at the output thereof, the enabling voltage applied to grounding gate 68 enables said gate 68 to open and breaks the ground connection to line 64. These two coincident actions prevent the application of spurious input signals to discriminator 54 and eliminates any switching transients, either condition being the possible cause of simulating critical voltage which might cause an erroneous and irreversible "take" signal to be sent to the camera as explained hereinafter.

In operation anomalous light conditions may cause, inter alia, "blooming" when excessive light causes excessive charges on the photosensitive sites exposed thereto. These charges spill over into relatively dark areas of the charge coupled device 33 to swamp other sites with their excess energy. This results in outputs of unvarying saturation level for long periods. Such outputs are not indicative of focus conditions and their presence is detected by integration circuit 34 which through its amplifiers provides automatic gain control as a function of line 64 voltage. Illustrated is one manner of preventing this wherein the output of integrating circuit 34 provides power via line 35 and gate 36 to iris motor 37 so as to close the iris 38 until the light input to the charge coupled device 33 has been normalized. Other alternatives are the reduction or modification of potentials on charge coupled device 33 to diminish the capture of light quanta or to diminish charge coupled device 33 conversion efficiency. Also, the pulse rate from the ring counter could be increased to assure more frequent drain on the potential wells or a combination of these stratagems may be employed.

When the reverse of the above conditions occurs, i.e. when insufficient light impinges on charge coupled device 33, then the integration circuit 34 can be made to cause opening of the iris, or the conversion efficiency of charge coupled device 33, at a time constant substantially longer than the pulse generator rate, can be increased. These are well known segments of the prior art.

When adverse conditions exceed the limits of the correcting ability of the automatic gain control function of the integrating circuit 34, these conditions are expressable in terms of voltage on line 64. The low limit would be just above noise level and the high limit would be line 64 maximum dc voltage. Two Schmitt Triggers 39 and 40 are set for such voltages and will be caused to flop over in response to these limit voltages, to such state that a voltage appears on either line 52, on low limit, or line 53, on high limit to actuate alarm 55, which, for example, may comprise an LED in the field of vision of the operator, while line 59 stops focusing sequence.

When optics 41 are driven by motor 42 over the focusing range, at some point good focusing will occur and the resultant sharp picture on charge coupled device 33 will cause high frequencies to appear at the input to discriminator 54 which responds with correspondingly high input to peak detector 44. Control of the optics motor may be effected by means set forth in one or more of the following U.S. Patents: Albrecht, No. 3,918,071; Aoki et al, No. 3,896,304; Connell, No. 3,783,296. One specific means, incorporated by reference herein, is shown and described in my U.S. Pat. No. 3,918,071, aforesaid at FIG. 2, column 2, lines 46 et seq. through column 3, line 24. As this high input drops off from its peak value, indicating that optimum force has been passed, peak detector 44 begins to initiate a correction of the over-run past optimum focus. When completed the peak detector stops the optics motor 42 and flops gate 36 so that iris motor 37 is disconnected from the automatic gain control line 35 and is now connected via gate 36 and line 45 to the exposure control 46. This will permit the iris to be set in terms of the exposure control's computations if the system is of the type which controls iris opening and holds exposure time fixed. If the system, however, controls time, then the iris will be set to some predetermined value.

When iris 38 is set, the mirror 47 is flopped up and will obscure charge coupled device 33. Integration circuit 34 will sense very low voltage on line 64 and send automatic gain control voltages over line 35 to gate 36 to open the iris. However, gate 36 at this instant is open to control voltages from line 35. Thus, no disturbance may occur to the picture taking process. Another undesirable effect of the obscuring of charge coupled device 33 is that low limit alarm 39 via 52 will give an alarm. This would be a nuisance alarm and can be prevented by disabling the alarm by setting gate 36 to have a normally closed connection except during "taking", via line 59.

With iris set and the mirror 47 flopped up by mechanical or electrical methods, well known in the art, the former a standard practice and the latter a matter of series switches, the curtain 43 is released to expose film 50. Completion of travel of curtain 43 can operate a switch (not shown) which sends power to the release solenoid 54 which drops the switch 13 from its latched up position and opens its electrical contacts. This removes all power from the system. Delayed gate 67 goes into its delaying state, gate 36 returns to its normally open state and grounding gate 68 will ground line 64. Switch 13 is ready for closing. A back contact 56 on switch 13 will operate curtain and film winding motor 57 to rewind the curtain and advance the film one frame after which it actuates an internal limit switch to remove itself from its line 58. All power drain is then off, and the device is set up for the next sharp focusing procedure.

I claim:

1. A device for automatically focusing an image in an optical system comprising:
   a photosensitive array having a plurality of discrete sites positioned in the focal plane of the optical system to dissect the image into segments crosswise and determine the light intensity at each segment,
   means interposed in the focal plane to vary the focus of the image, the illumination of the photosensitive array being dependent on the degree of focus of the image, said discrete sites having a charge produced depending on the degree of illumination,
   plural means to scan vertically and horizontally the photosensitive array and read out the charges on said discrete sites to form a pulse train, and
   discrimination means connected to the address means to determine when the frequency of the pulse train is maximized to indicate sharp focusing of the image, as the focus of the image is varied;
   means connected to the photosensitive array to delay activation of the discrimination means for a predetermined time sufficient to clear spurious charges from sites on the photosensitive array to preclude erroneous indication of sharp focusing of the image.

2. A device for automatically focusing an image in an optical system comprising:
   a photosensitive array having a plurality of discrete sites positioned in the focal plane of the optical system to dissect the image into segments crosswise and determine the light intensity at each segment,
   means interposed in the focal plane to vary the focus of the image, the illumination of the photosensitive array being dependent on the degree of focus of the image, said discrete sites having a charge produced depending on the degree of illumination, plural means to scan vertically and horizontally the photosensitive array and read out the charges on said discrete sites to form a pulse train, discrimination means connected to the address means to determine when the frequency of the pulse train is maximized to indicate sharp focusing of the image, as the focus of the image is varied; and means connected to the photosensitive array to normalize illumination thereof under excessive light or insufficient light conditions.

3. A device for automatically focusing an image in an optical system wherein the optical system is part of a camera comprising:

a photosensitive array which is shaped to approximate the format of the image, said array having a plurality of discrete sites positioned in the focal plane of the optical system to dissect the image and to segments cross-wise and determine the light intensity at each segment, means interposed in the focal plane to vary the focus of the image, the illumination of the photosensitive array being dependent on the degree of focus of the image, said discrete sites having a charge produced depending on the degree of illumination, plural means to scan vertically and horizontally the photosensitive array and read out the charges on said discrete sites to form a pulse train, discrimination means connected to the address means to determine when the frequency of the pulse train is maximized to indicate sharp focusing of the image, as the focus of the image is varied;

means connected to the photosensitive array to delay activation of the discrimination means for a predetermined time sufficient to clear spurious charges from sites on the photosensitive array to preclude erroneous indication of sharp focusing of the image.

4. A device for automatically focusing an image in an optical system as recited in claim 1, further comprising:

means connected to the photosensitive array to normalize illumination thereof under excessive light or insufficient light conditions.

* * * * *